(12) United States Patent
Ito et al.

(10) Patent No.: US 7,883,766 B2
(45) Date of Patent: Feb. 8, 2011

(54) PREPREG

(75) Inventors: Akihiro Ito, Toyohashi (JP); Tadayoshi Saitou, Toyohashi (JP); Ietsugu Santo, Toyohashi (JP); Junichi Muramatsu, Toyohashi (JP); Yasuo Takagi, Toyohashi (JP); Kiharu Numata, Toyohashi (JP); Yasuhiro Fukuhara, Toyohashi (JP); Mina Oobayashi, Toyohashi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 453 days.

(21) Appl. No.: 11/995,438

(22) PCT Filed: Jul. 12, 2006

(86) PCT No.: PCT/JP2006/313906

§ 371 (c)(1),
(2), (4) Date: Jan. 11, 2008

(87) PCT Pub. No.: WO2007/007812

PCT Pub. Date: Jan. 18, 2007

(65) Prior Publication Data

US 2009/0111924 A1    Apr. 30, 2009

(30) Foreign Application Priority Data

Jul. 13, 2005 (JP) .............................. 2005-204278

(51) Int. Cl.
B32B 27/04 (2006.01)
B32B 27/34 (2006.01)
B32B 27/38 (2006.01)
C08L 63/00 (2006.01)

(52) U.S. Cl. .................... 428/297.4; 428/413; 525/524; 525/533

(58) Field of Classification Search .............. 428/297.4, 428/413, 414, 415, 416, 417, 418; 525/523, 525/524, 525, 526, 533

See application file for complete search history.

(56) References Cited

U.S. PATENT DOCUMENTS

| 2,705,223 A | 3/1955 | Renfrew et al. |
| 2,986,539 A | 5/1961 | Schniepp et al. |
| 3,472,730 A | 1/1969 | Frigstad et al. |
| 2005/0008868 A1 | 1/2005 | Nakamura et al. |

FOREIGN PATENT DOCUMENTS

| JP | 40 1874 | | 2/1965 |
| JP | 51 58484 | | 5/1976 |
| JP | 55 71771 | | 5/1980 |
| JP | 56 152832 | | 11/1981 |
| JP | 58 53913 | | 3/1983 |
| JP | 58 124126 | | 7/1983 |
| JP | 60 63229 | | 4/1985 |
| JP | 60 231738 | | 11/1985 |
| JP | 61 103992 | | 5/1986 |
| JP | 62 153349 | | 7/1987 |
| JP | 63 99222 | | 4/1988 |
| JP | 64 6019 | | 1/1989 |
| JP | 1 110537 | | 4/1989 |
| JP | 3 203923 | | 9/1991 |
| JP | 4 339818 | | 11/1992 |
| JP | 3026372 | | 1/2000 |
| JP | 2007-169312 A | * | 7/2007 |
| JP | 2007-217462 A | * | 8/2007 |
| JP | 2007-217463 A | * | 8/2007 |
| WO | 96 02592 | | 2/1996 |
| WO | 01 42330 | | 6/2001 |

OTHER PUBLICATIONS

JPO abstract of JP 2007-217463 A (2007).*
JPO abstract of JP 2007-217462 A (2007).*
JPO abstract of JP 2007-169312 A (2007).*
JPO abstract of JP 04-339818 A (1992).*

* cited by examiner

*Primary Examiner*—Michael J Feely
(74) *Attorney, Agent, or Firm*—Oblon, Spivak, McClelland, Maier & Neustadt, L.L.P.

(57) ABSTRACT

A prepreg is provided capable of being a composite material having suitable high heat resistance, impact resistance, and mechanical properties under high temperature and high humidity conditions. As the matrix resin, a composition including a specific epoxy resin component (A), a specific bifunctional epoxy resin (B), a specific tetrafunctional epoxy resin (C), and a specific aromatic amine compound (D) at specific proportions are used. Particularly, as the epoxy resin component (A), one obtained by mixing and heating a bifunctional epoxy resin (a1), a trifunctional epoxy resin (a2), a phenol compound (a3), and a specific polyamide resin (a4) is used so as to be able to solve the above-described problems.

18 Claims, No Drawings

PREPREG

CROSS-REFERENCE TO RELATED APPLICATIONS

The present application is a 35 U.S.C. §371 National Stage patent application of International patent application PCT/JP06/313906, filed on Jul. 12, 2006, which claims priority to Japanese patent application JP 2005-204278, filed on Jul. 13, 2005.

TECHNICAL FIELD

The present invention relates to an intermediate for a composite material that is useful for aircrafts, automobiles, or other general industries.

BACKGROUND ART

Epoxy resins have been traditionally used to a large extent as matrix resins for composite materials due to their adhesiveness or high rigidity. However, as the performance level required for the composite materials is ever increasing, various investigations on the matrix resins being used are in progress. The performances required for the composite materials include, for example, heat resistance, impact resistance (toughness), and mechanical properties under high temperature and high humidity conditions (particularly interlayer shear strength (ILSS), or the like).

Specifically, an epoxy resin composition comprising N,N,N',N'-tetraglycidylmethane (TGDDM) as a main component, and 4,4'-diaminodiphenylmethane (DDS) as a curing agent, has been used extensively in applications where heat resistance is required. However, although this composition has excellent heat resistance, rigidity, or the like, it has low impact resistance. Accordingly, in order to confer impact resistance, a bifunctional epoxy resin, e.g., a bisphenol A type epoxy resin, may be used as a main component. However, in this case, heat resistance is lowered, thereby required performances often becoming unsatisfactory. Furthermore, as an attempt to improve impact resistance, there has been proposed a method of adding a rubber-like polymer such as an acrylonitrile-butadiene copolymer to an epoxy resin, etc., and then micro-phase separating a rubber layer comprising the rubber-like polymer during the curing of the epoxy resin. However, this method also has a tendency to lower heat resistance or rigidity being lowered.

As such, it has been very difficult to attain satisfaction both in impact resistance and heat resistance.

Furthermore, as disclosed in Patent Documents 1 and 2, for example, there is a method of adding a thermoplastic resin, e.g., polyethersulfone (PES), to an epoxy resin composition having high heat resistance, in order to confer impact resistance to the epoxy resin composition. However, in order to obtain a certain effect through this method, it is necessary to add a large amount of a thermoplastic resin, and as a result, the viscosity of the epoxy resin composition is increased. Generally, in the production of a golf club shaft or a tennis racket comprising a composite material, a prepreg obtained by impregnation of reinforcing fibers with an epoxy resin composition is used as a raw material, and this prepreg is usually prepared by heating and pressurizing reinforcing fibers which have been arranged in one direction over an epoxy resin composition applied on a silicone-coated paper, thus to impregnate the reinforcing fibers with the epoxy resin composition. For this reason, an increase in the viscosity of such an epoxy resin composition significantly deteriorates characteristics such as appropriate adhesion and flexibility that are highly required for a prepreg. Also, as the viscosity of the epoxy resin composition is increased, the capability of the prepreg to pass through the production process is also remarkably lowered.

As a method for improving impact resistance, there is proposed in Patent Document 3 a method for improving the interlayer peeling strength in a multi-layer composite material. This method involves distributing fine particles of a thermoplastic resin concentrated between the layers, but such a method cannot avoid significant reduction in the level of adhesion of a prepreg, while posing new problems such as complications in processes and complications in quality control. Patent Document 3 also discloses the use of fine particles of nylon 6 as the fine particles of thermoplastic resin; however, nylon 6 absorbs moisture under high temperature and high humidity conditions, usually to an extent of 4.5% by weight, and such moisture absorption may deteriorate the mechanical properties of the composite material.

Furthermore, for the same purpose, there has been proposed an attempt to localize chopped fibers or milled fibers of nylon or the like between the layers. However, this method cannot avoid the same problem concerning moisture absorption, and the effect is not necessarily satisfactory.

In addition, as a method for improving the impact resistance, there are proposed methods involving inserting between the layers a sort of impact absorbing layer which is referred to as an interleaf (see Patent Documents 4 to 7). However, in all of these methods, the interlayer thickness is increased, and thus the fiber ratio may be decreased, or the heat resistance, and mechanical strength under high temperature and high humidity conditions of the resulting composite material, the adhesion of the resulting prepreg, and the like may be deteriorated, thereby handlability being lowered, or the like.

Therefore, the present applicant has proposed in Patent Document 8 a technology relating to a prepreg that has heat resistance, impact resistance, and mechanical properties under a high temperature and high humidity, while maintaining appropriate properties required for a prepreg, such as adhesion and flexibility, or a good capability to pass through the production process, in which prepreg a resin composition obtained by blending a reaction mixture of a bifunctional epoxy resin, a trifunctional epoxy resin, and a phenol compound, with a tetrafunctional epoxy resin and an aromatic amine, is used as the matrix resin.

However, recently, the demand for higher performance of composite materials in the market has further increased, and a material is desired which simultaneously satisfies higher heat resistance, impact resistance, and mechanical properties under high temperature and high humidity.

Further, Patent Document 8 describes that by further blending an elastomer such as a butadiene-acrylonitrile copolymer having carboxylic groups on both ends, with the above-described resin composition, higher impact resistance can be exhibited. However, if a rubber component such as the elastomer is simply blended, the impact resistance may be improved in accordance with the blending amount, but the heat resistance is again deteriorated.

Furthermore, there is also proposed a method for inhibiting reduction in heat resistance as well as improving the mechanical properties under high temperature and high humidity conditions, by blending a heat resistant component. For example, Patent Documents 9 to 11 disclose resin compositions obtained by blending an epoxy resin with a polyamide resin. However, even if these resin compositions were used for prepregs, sufficient effects would not be obtained.

Moreover, Patent Documents 12 to 15, Patent Documents 16 to 17, and Patent Document 18 each describe that a specific polyamide resin is added to an epoxy resin, and this mixture is used as the matrix resin of a prepreg. However, if the resin composition as described in Patent Documents 12 to 15 is used in a prepreg, problems occur such as an insufficient improvement of impact resistance, poor capability of the prepreg to pass through the production process, and short work life of the prepreg. Further, with the technology as described in Patent Documents 16 to 17, the phase structure of the matrix resin varies depending on the curing conditions or the state of mixing of the matrix resin. As a result, it becomes difficult to simultaneously satisfy both the heat resistance and the mechanical properties under high temperature and high humidity. Also, in the technology of Patent Document 18, impact resistance may be improved, but there is a drawback that rigidity satisfying the requirements of the market cannot be ensured.

[Patent Document 1] Japanese Unexamined Patent Application Publication No. S58-124126

[Patent Document 2] Japanese Unexamined Patent Application Publication No. S62-153349

[Patent Document 3] Japanese Unexamined Patent Application Publication No. H1-110537

[Patent Document 4] U.S. patent application Ser. No. 3,472,730

[Patent Document 5] Japanese Unexamined Patent Application Publication No. S51-58484

[Patent Document 6] Japanese Unexamined Patent Application Publication No. S60-63229

[Patent Document 7] Japanese Unexamined Patent Application Publication No. S60-231738

[Patent Document 8] Japanese Patent No. 3026372

[Patent Document 9] Japanese Examined Patent Publication No. S40-1874

[Patent Document 10] Japanese Unexamined Patent Application Publication No. S55-71771

[Patent Document 11] Japanese Unexamined Patent Application Publication No. S56-152832

[Patent Document 12] U.S. patent application Ser. No. 2,705,223

[Patent Document 13] U.S. patent application Ser. No. 2,986,539

[Patent Document 14] Japanese Unexamined Patent Application Publication No. S58-53913

[Patent Document 15] Japanese Unexamined Patent Application Publication No. S63-99222

[Patent Document 16] Japanese Unexamined Patent Application Publication No. S61-103992

[Patent Document 17] Japanese Unexamined Patent Application Publication No. S64-6019

[Patent Document 18] Japanese Unexamined Patent Application Publication No. H3-203923

DISCLOSURE OF THE INVENTION

Problems to be Solved by the Invention

The present invention has been achieved under consideration of such circumstances, and has an object to provide a prepreg capable of providing a composite material that satisfies high heat resistance, impact resistance, and mechanical properties under high temperature and high humidity conditions.

Means for Solving the Problems

The prepreg of the present invention is a prepreg comprising a resin composition and reinforcing fibers, wherein the reinforcing fibers are impregnated with the resin composition, and the resin composition comprises:

an epoxy resin component (A) prepared by mixing 100 parts by mass in total of a mixture comprising 10 to 90 parts by mass of a bifunctional epoxy resin (a1), 0.5 to 40 parts by mass of a trifunctional epoxy resin (a2), and 10 to 50 parts by mass of a phenol compound (a3) represented by the following formula (I), with 1 to 45 parts by mass of a polyamide resin (a4) represented by the following formula (II), in which component 80% or more of the phenolic hydroxyl groups contained in the phenol compound (a3) have been reacted;

a bifunctional epoxy resin (B), a tetrafunctional epoxy resin (C), an aromatic amine compound (D); and wherein the bifunctional epoxy resin (B) is contained to the range of 10 to 50 parts by mass, and the tetrafunctional epoxy resin (C) is contained to the range of 15 to 70 parts by mass, based on 20 to 70 parts by mass of the epoxy resin component (A), and the aromatic amine compound (D) is contained within the range such that the theoretical equivalent thereof relative to the epoxy group is to the range of 90 to 175%.

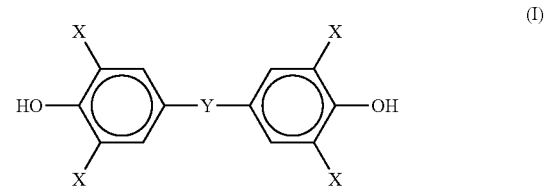

(I)

[wherein X represents at least one selected from the group consisting of a hydrogen atom, an alkyl group having 6 or less carbon atoms, and Br; and Y represents at least one selected from the group consisting of a direct bond, —CH$_2$—, —C(CH$_3$)$_2$—, —SO$_2$—, and a group represented by:

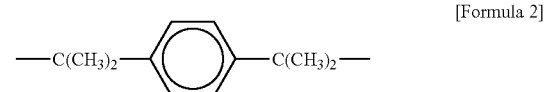

[Formula 2]

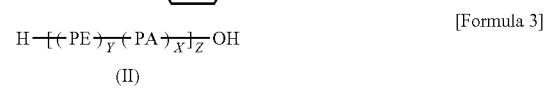

[Formula 3]

(II)

[wherein X represents an integer from 1 to 10; Y represents an integer from 1 to 10, and Z represents an integer from 1 to 20; PA is represented by the following formula (III):

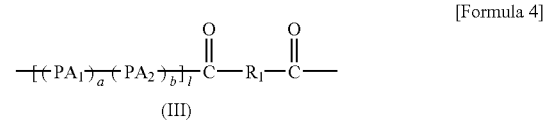

[Formula 4]

(III)

(wherein "a" represents an integer from 0 to 2, "b" represents an integer from 0 to 2, and "l" represents an integer from 1 to 10, provided that "a" and "b" are not 0 at the same time); R$_1$ is —(CH$_2$)$_\alpha$— (wherein α is an integer from 2 to 40); PA$_1$ and $PA_2$ are each independently represented by the following formula (IV) and/or formula (V); and PE is represented by the following formula (VI):

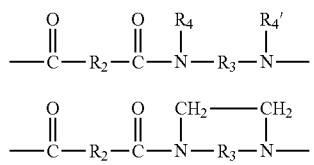
(IV)

(V)

The bifunctional epoxy resin as the component (a1) is an epoxy resin having two epoxy groups in its molecule, and examples thereof include a bisphenol A type epoxy resin, a bisphenol F type epoxy resin, bromination products thereof, a bisphenol S type epoxy resin, an epoxy resin having an alkyl backbone in the main chain, a biphenyl type epoxy resin, a naphthalene type epoxy resin, a dicyclopentadiene type epoxy resin, a fluorene type epoxy resin, and modification products thereof. These may be used alone or in a combination of at least two kinds thereof. Further, as one example of such resins, the bisphenol type epoxy resin is represented by the following formula (VII).

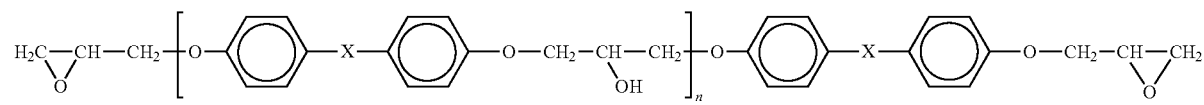
(VII)

(In the formulae (IV) and (V), $R_2$ is —$(CH_2)_\beta$— (wherein β is an integer from 2 to 40). $R_3$ is —$(CH_2)_d$— (wherein d is an integer from 1 to 6). Further, $R_4$ and $R_4'$ are each independently H or $CH_3$.

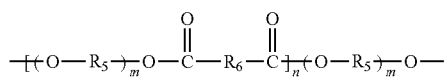
(VI)

wherein "m" and "n" are an integer from 3 to 20 and an integer from 1 to 10, respectively, and $R_5$ is —$(CH_2)_e$— (wherein e is an integer from 2 to 8). $R_6$ is —$(CH_2)_\gamma$— (wherein γ is an integer from 2 to 40))].

Furthermore, the epoxy resin component (A) is preferably prepared by preliminarily mixing the bifunctional epoxy resin (a1) and/or the trifunctional epoxy resin (a2) with heating, with the polyamide resin (a4), and then mixing and heating the resulting mixture at least with the phenol compound (a3).

According to the present invention, a prepreg capable of providing a composite material which satisfies high heat resistance, impact resistance, and mechanical properties under high temperature and high humidity can be provided.

BEST MODE FOR CARRYING OUT THE INVENTION

Hereinafter, the present invention will be described in detail.

The prepreg of the present invention is a prepreg in which reinforcing fibers are impregnated with a resin composition containing, as essential components, the components (A) to (D) that will be described below.

[Component (A)]

The component (A) is an epoxy resin component obtained by mixing a bifunctional epoxy resin (a1), a trifunctional epoxy resin (a2), a phenol compound (a3) represented by the formula (I), and a polyamide resin (a4) represented by the formula (II), and heating the mixture.

wherein

X represents

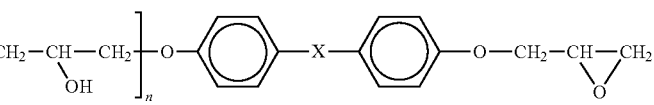

and n represents an integer of 0 to 30

The trifunctional epoxy resin as the component (a2) is an epoxy resin having three epoxy groups in its molecule, and representative examples thereof include, N,N,O-triglycidyl-p- or -m-aminophenol, N,N,O-triglycidyl-4-amino-m- or -5-amino-o-cresol, and 1,1,1-(triglycidyloxyphenyl)methane.

Further, as the trifunctional epoxy resin, a commercially available trifunctional epoxy resin can be used, including, for example, Ep630 manufactured by Japan Epoxy Resin Co., Ltd, YX-4, MY0510 manufactured by Huntsman Inc., ELM-100 manufactured by Sumitomo Chemical Co., Ltd., and EXA4506 manufactured by Dainippon Ink and Chemical, Inc. These trifunctional epoxy resins may be used alone or in a combination of at least two kinds thereof.

The phenol compound as the component (a3) satisfies the above structural formula (I), and specific examples thereof include 4,4'-dihydroxybiphenyl, 4,4'-dihydroxy-3,3',5,5'-tetramethyldihydroxybiphenyl, 4,4'-dihydroxy-3,3',5,5'-tetra-tert-butyldiphenyl, bisphenol F, tetramethylbisphenol F, bisphenol A, tetramethylbisphenol A, bisphenol S, tetramethylbisphenol S, 4,4'-(p-phenylenediisopropylidene) bis(xylenol). They may be used alone or in a combination of at least two kinds thereof.

The polyamide resin as the component (a4) is a polyether ester amide (polyether ester amide block copolymer) represented by the formula (II). This polyether ester amide is a polymer obtained by a reaction between a polyamide component, and a polyether ester component including polyoxyalkylene glycol and dicarboxylic acid, in which the polymer has an amide bond, an ether bond, and an ester bond in the molecular chain, exhibits high compatibility with an epoxy resin, and is low moisture absorption under high temperature and high humidity conditions.

Accordingly, by selecting this polyether ester amide, a composite material can be provided, which satisfies high heat resistance and impact resistance, as well as mechanical properties under high temperature and high humidity conditions.

In the formula (II), PA is represented by the formula (III), and PE is represented by the formula (VI).

Further, in the formula (III), $PA_1$ and $PA_2$ are each independently represented by the formula (IV) and/or formula (V). That is, both of $PA_1$ and $PA_2$ may have the structures represented by either of the formula (IV) and the formula (V), or one of $PA_1$ and $PA_2$ may have the structure represented by the formula (IV), and the other may have the structure represented by the formula (V).

In addition, in the formula (II), X is an integer from 1 to 10, Y is an integer from 1 to 10, and Z is an integer from 1 to 20. In the formula (III), "a" is an integer from 0 to 2, "b" is an integer from 0 to 2, and "1" is an integer from 1 to 10, provided that "a" and "b" are not 0 at the same time. $R_1$ is —$(CH_2)_\alpha$— (wherein $\alpha$ is an integer from 2 to 40).

Further, in the formulas (IV) and (V), $R_2$ is —$(CH_2)_\beta$— (wherein $\beta$ is an integer from 2 to 40). $R_3$ is —$(CH_2)_d$— (wherein d an integer from 1 to 6). $R_4$ and $R_4'$ are each independently H or $CH_3$.

Further, in the formula (VI), "m" and "n" are an integer from 3 to 20 and an integer from 1 to 10, respectively. $R_5$ is —$(CH_2)_e$— (wherein e is an integer from 2 to 8). $R_6$ is —$(CH_2)_\gamma$— (wherein $\gamma$ is an integer from 2 to 40).

As a method for preparing the polyether ester amide, any method for obtaining a uniformly polymer having a high molecular weight can be employed. For example, first, there may be mentioned a method of synthesizing a polyamide oligomer, adding polyoxyalkylene glycol and dicarboxylic acid thereto, and heating the mixture under reduced pressure to achieve polymerization to a high polymerization degree.

As the polyether ester amide, a commercially available product can be used. Examples of the commercially available product of polyether ester amide include TPAE series (TPAE12, TPAE31, TPAE32, TPAE38, TPAE8, TPAE10, TPAE100, TPAE23, TPAE63, TPAE200, TPAE201, TPAE260, and TPAE260) manufactured by Fuji Kasei Co., Ltd.

Among these, TPAE32 is a mixture of those represented by the formula (II), and in the formulas (II) to (VI), X=Y=1, Z=7.26, a=0.16, b=0.84, 1=2.23, $\alpha$=10, $\beta$=34, d=2, m=14, n=1, $\gamma$=10, and e=4, as presented as average values. Furthermore, $R_4$ and $R_4'$ are both H. In TPAE32, $PA_1$ and $PA_2$ are in a mixture of the structures represented by the formula (IV) and the formula (V).

The epoxy resin component (A) can be obtained by mixing the above-described component (a1), component (a2), component (a3) and component (a4), and heating the mixture. While heating the mixture, a catalyst may be added, if necessary. Here, it is necessary to perform the heating such that 80% or more of the phenolic hydroxyl groups contained in the phenol compound (a3) undergo a reaction, thus leaving behind only less than 20% of the phenolic hydroxyl groups. If 20% or more of the phenolic hydroxyl groups remain, water resistance and storage stability of the obtained resin composition would be significantly lowered. Preferably, the reaction rate of the phenolic hydroxyl groups is 90% or more.

In a method for preparing the epoxy resin component (A), a mixture of the (a1) to the component (a4) may be heated under the condition such as that 80% or more of the phenolic hydroxyl groups undergo a reaction as described above, and preferably under the condition that the reaction proceeds relatively smoothly. Specifically, in the case where a catalyst is not used, the mixture is heated to the range of 100 to 150° C. for 5 to 24 hours, and in the case where a catalyst is used, the mixture is suitably heated to the range of 100 to 130° C. for 2 to 6 hours.

A more preferable method for preparing the epoxy resin component (A) includes a production method comprising preliminarily mixing the component (a1) and/or the component (a2) with the component (a4), heating the mixture to the range of 150 to 180° C. for 1 to 6 hours to dissolve at least a portion of the component (a4) in the component (a1) and/or the component (a2), and then adding the other essential components including at least the phenol compound (a3), and heating the mixture to the range of 100 to 150° C. for 5 to 24 hours in the case of using no catalyst, or to the range of 100 to 130° C. for 2 to 6 hours in the case of using a catalyst. When the epoxy resin component (A) obtained in this preparation method is used, a composite material that satisfies high heat resistance and impact resistance, as well as mechanical properties under high temperature and high humidity conditions, can be provided.

Moreover, the catalyst used in the preparation of the epoxy resin component (A) is not particularly limited, provided it suitably promotes the reaction between an epoxy group and a phenolic hydroxyl group, and triphenylphosphine (TPP) is particularly preferable. The amount of the catalyst can be suitably set such that the reaction proceeds without any problems.

The epoxy resin component (A) can be prepared in the above-described manner, and for the proportions of each component, it is required that 1 to 45 parts by mass of the polyamide resin (a4) be used, based on 100 parts by mass in total of a mixture including 10 to 90 parts by mass of the bifunctional epoxy resin (a1), 0.5 to 40 parts by mass of the trifunctional epoxy resin (a2), and 10 to 50 part by mass of the phenol compound (a3).

Here, when the proportion of the bifunctional epoxy resin (a1) is set to 10 parts by mass or more, the impact resistance of the resin composition becomes sufficient; and when the proportion of the bifunctional epoxy resin (a1) is set to 90 parts by mass or less, it is possible to inhibit a decrease in the heat resistance of the resin composition. When the proportion of the trifunctional epoxy resin (a2) is set to 0.5 part by weight or more, it is possible to obtain sufficient heat resistance; and when the proportion of the trifunctional epoxy resin (a2) is set to 40 parts by mass or less, the possibility of gelation occurring during the preparation of the epoxy resin component (A) is suppressed to the minimum. When the proportion of the phenol compound (a3) is set to 10 parts by mass or more, it is possible to obtain sufficient impact resistance; and when the proportion of the phenol compound (a3) is set to 50 parts by mass or less, a dense bridged backbone can be obtained during the preparation of the epoxy resin component (A), thus providing good heat resistance, and there is no possibility that 20% or more of the phenolic hydroxyl groups remain unreacted. Furthermore, if the proportion of the polyamide resin (a4) is 1 part by mass or more, based on 100 parts by mass in total of a mixture of the components (a1) to (a3), the impact resistance of the resin composition becomes sufficient; and if the proportion of the polyamide resin (a4) is 45 parts by mass or less, the viscosity of the resin composition is maintained low, and thus a prepreg having good handlability can be obtained. A more preferable proportion of the polyamide resin (a4) is 3 to 20 parts by mass.

By preparing the epoxy resin component (A) as such, it becomes possible to control the morphology so as to have a sea-and-island structure, in which the phenol compound (a3)

and the polyamide resin (a4) each form the island phase (soft segments), and the bifunctional epoxy resin (a1) and the trifunctional epoxy resin (a2) each form the sea phase (hard segments).

When the polyamide resin (a4) is fixed as the island phase in the epoxy resin component (A), even if the obtained resin composition is heated and cured, the polyamide resin (a4) exists in the resin composition as the island phase which takes the role of a soft segment in the resin composition, without phase separation. As a result, the obtained resin composition exhibits very high impact resistance. Moreover, as for the soft segments, an island phase including the phenol compound (a3) is also present in addition to the island phase comprising the polyamide resin (a4). Accordingly, a synergic effect of each soft segment is manifested, and thus as compared with a soft segment formed of only one of them, the impact resistance of the obtained resin composition is greatly improved. As a result, when the resin composition is used in a composite material such as a carbon fiber composite material, high compression after impact (CAI) is exhibited.

Further, since the polyamide resin (a4) is uniformly distributed in the resin composition as an island portion, the moisture absorption of the polyamide resin (a4) can be drastically reduced. As a result, deterioration of the mechanical properties of the composite material under high temperature and high humidity conditions, can also be reduced, which has hardly been accomplished in prior art.

Moreover, the resin composition obtained by using, as the sea phase, the below-described tetrafunctional epoxy resin (C) that can exhibit heat resistance, and the below-described component (D) that serves as a curing agent, in combination with the component (A), has excellent heat resistance with improved impact resistance, as described above.

Specifically, the resin composition obtained by using the components (B) to (D) as described below, in combination with the epoxy resin component (A) exhibits high heat resistance with a glass transition temperature (Tg) of higher than 150° C. Further, a composite material for which the resin composition is used, has a compression after impact (CAI) of more than 190 MPa, and also can reduce the deterioration of mechanical properties under high temperature and high humidity conditions, and the interlayer shear strength (ILSS) at 70° C. obtained after allowing a carbon fiber composite material to absorb moisture to saturation, exceeds 50 MPa. Accordingly, by using the resin composition in which the epoxy resin component (A) and the components (B) to (D) as described below, there can be provided a composite material satisfying high heat resistance, impact resistance, and mechanical properties under high temperature and high humidity conditions, which have hardly been accomplished in prior art.

Furthermore, by using, as a polyamide resin (a4), a polyether ester amide represented by the formula (II), particularly having low moisture absorption even under high temperature and high humidity conditions, the mechanical properties under high temperature and high humidity conditions can be further enhanced.

[Component (B)]

The bifunctional epoxy resin used as the component (B) can be used in the same manner as various epoxy resins exemplified above as the component (a1). Moreover, the bifunctional epoxy resins used for the component (a1) and the component (B) may be the same as or different from each other.

[Component (C)]

The component (C) is a component for improving the heat resistance of the resin composition, and representative examples of the tetrafunctional epoxy resin to be used include N,N,N',N'-tetraglycidylaminodiphenylmethane, N,N,N',N'-tetraglycidyl-4,4'-(4-aminophenyl)-p-diisopropylbenzene, and 1,1,2,2-(tetraglycidyloxyphenyl)ethane.

[Component (D)]

The component (D) is a component that serves as a curing agent, and as the aromatic amine compound, aromatic amines such as 4,4'-diaminodiphenylsulfone, 3,3'-diaminodiphenylsulfone, 4,4'-diaminodiphenylmethane, 4,4'-diaminodiphenylether, and trimethylene bis(4-aminobenzoate) are used. Among these, 4,4'-diaminodiphenylsulfone and 3,3'-diaminodiphenylsulfone are particularly preferred from the viewpoints of heat resistance or high availability.

[Resin Composition]

In the present invention, the resin composition for impregnating the reinforcing fiber can be prepared by blending, based on 20 to 70 parts by mass of the component (A), 10 to 50 parts by mass of the component (B), 15 to 70 parts by mass of the component (C), and the aromatic amine compound (D) to the extent that the theoretical equivalent of the aromatic amine compound based on the epoxy group, as calculated by the from the following equation [Equation 1], is in the range of 90 to 175% equivalent. If the proportions of the component (A) through the component (C) are within these ratios, a composite material satisfying high heat resistance, impact resistance, and mechanical properties under high temperature and high humidity conditions can be obtained. Further, if the proportion of the component (D) is set to 90% equivalent or more, the resin composition can be sufficiently cured, thereby giving satisfactory physical properties. On the contrary, if the proportion of the component (D) is set to 175% equivalents or less, the cross-linking density can be in an appropriate range, and good heat resistance and solvent resistance may be obtained. More preferably, the proportion of the component (A) is set to 30 to 60 parts by mass, and based on this, the proportions of the component (B) and the component (C) are set to 20 to 40 parts by mass and 20 to 60 parts by mass, respectively. Furthermore, the proportion of the component (D) is more preferably 100 to 150% of the theoretical equivalent.

Even more preferably, the proportion of the component (A) is set to 45 to 55 parts by mass, the proportion of the component (B) is set to 20 to 35 parts by mass, the proportion of the component (C) is set to 20 to 35 parts by mass, and the proportion of the component (D) is set to 35 to 45 parts by mass (100 to 130% of the theoretical equivalent).

> Theoretical amount of component $(D)$=[Total moles of the epoxy groups in components $(a1)$ and $(a2)$ that have been consumed during the preparation of component $(A)$]−[Moles of the phenolic OH in component $(a3)$ that has been consumed during the preparation of component $(A)$]+[Total moles of the epoxy groups in components $(B)$ and $(C)$]   [Equation 1]

In the resin composition, other epoxy resins (E) can be used in combination within the scope of not breaking the balance between the physical properties. As the other epoxy resins, for example, a novolak type epoxy resin can be mentioned.

Examples of the other epoxy resin include an epoxy resin having an amine such as triglycidyl p-aminophenol, triglycidyl m-aminophenol or triglycidylaminocresol as the precursor, various isomers thereof, and a novolak type epoxy resin; an epoxy resin having a carbon-carbon double bond as the precursor, such as an alicyclic epoxy resin, and an epoxy resin having a polygonal backbone such as naphthalene, but are not limited thereto. Further, they also include an epoxy resin in which a part of the epoxy group has been modified with a thermoplastic resin, an elastomer, an isocyanate, or the like. Furthermore, an epoxy resin that has been imparted with fire retardancy by being modified with brome or the like, can also be favorably used, but the examples are not limited thereto.

The amount of the component (E) to be used is preferably 20% or less of the total resin components, namely, the sum of the components (A), (B), and (C).

Moreover, in the resin composition, a so-called elastomer component such as a butadiene-acrylonitrile copolymer having carboxylic groups on both ends, or a thermoplastic resin component such as polyethersulfone, polysulfone, polyether ether ketone, polyetherimide or polyvinyl butyrate, may be used in combination, where desired. The amount of these components to be used may be suitably determined, within the scope of not breaking the balance between the physical properties. In addition, silica powders, Aerosils, microballoons, inorganic compounds such as antimony trioxide may also be added in the composition, where desired.

[Reinforcing Fiber and Composite Intermediate Material]

Examples of the reinforcing fiber to be impregnated with the resin composition include carbon fiber, glass fiber, aramid fiber, boron fiber, and silicon carbide fiber, and these can be used in the form of milled fiber, chopped fiber, continuous fiber, various fabrics, or the like. Among these, high-strength, high-elongation carbon fiber having a tensile strength of 450 MPa or more and a tensile elongation of 1.7% or more, which is in the form of continuous fiber or various fabrics, is most appropriately used.

A method for impregnating the reinforcing fibers with the resin composition is not particularly limited, but conventional methods may be used.

By means of the composite intermediate material obtained by impregnating reinforcing fibers with the above-described resin composition, there can be provided a composite material satisfying all of heat resistance, impact resistance, and mechanical properties under high temperature and high humidity conditions, which has hardly been accomplished in prior art.

EXAMPLES

Hereinbelow, the present invention will be described in detail with reference to the following examples.

Respective components to be used in each Example are as follows:

Components (a1) and (B)

Epikote 807 (Ep807): Manufactured by Japan Epoxy Resins Co., Ltd., Bisphenol F type epoxy resin, Average molecular weight: about 312

Epikote 828 (Ep828): Manufactured by Japan Epoxy Resins Co., Ltd., Bisphenol A type epoxy resin, Average molecular weight: about 340

HP-7200: Manufactured by Dainippon Ink & Chemicals Co., Ltd., Dicyclopentadiene type epoxy resin Component (a2)

Epikote 630 (Ep630): Manufactured by Japan Epoxy Resins Co., Ltd., Average molecular weight: 318

Component (a3)

4,4'-(p-Phenylenediisopropylidene) bis(2,6-xylenol) (molecular weight 402)

Component (a4)

TPAE32: Fuji Kasei Co., Ltd., Polyetheresteramide of polymeric fatty acids Component (C)

Epikote 604 (Ep604): Manufactured by Japan Epoxy Resins Co., Ltd., TGDDM, Average molecular weight: 302

Component (D)

DDS: Manufactured by Wakayama Seika SeikaCure-S 4,4'-diaminodiphenylsulfone

Other components

Aerosil: Manufactured by Nippon Aerosil Co., Ltd., A380

PES: Manufactured by Sumitomo Chemical Co., Ltd., PES5003P Catalyst

TPP: Manufactured by Kishida Chemical Co., Ltd., Triphenylphosphine, Purity: 99% or more Example 1

580 g of Ep807 as the component (a1) and 60 g of TPAE32 as the component (a4) were mixed, and the mixture was heated at 180° C. for 4 hours to dissolve the component (a4) in the component (a1). Thereafter, 60 g of Ep630 as the component (a2), 350 g of 4,4'-(p-phenylenediisopropylidene) bis(2,6-xylenol) as the component (a3), and 10 g of triphenylphosphine (TPP, manufactured by Kishida Chemical Industry Co., Ltd.) as a catalyst were added thereto. The mixture was heated at 100° C. for 2 hours to prepare a component (A). At this time, the amount of unreacted phenolic hydroxyl groups of 4,4'-(p-phenylenediisopropylidene) bis (2,6-xylenol) was 1% or less.

Further, as for the extent of reaction of the phenolic hydroxyl group, the peak intensity of the phenol compound that did not react, of which peak intensity was detected by GPC measurement of the preliminary reactants (hereinafter, referred to as unreacted phenol compounds), and a preliminarily produced calibration curve plotted for the peak intensity and the amount of the phenol compound were used to determine the amount of unreacted phenol compound. The extent of reaction was calculated using the following equation.

Extent of non-reaction (%)=(Amount of unreacted phenol compounds/Amount of phenol compound used for reaction)×100

Measurement conditions for GPC are as follows:

Measuring instrument: HLC-8220GPC manufactured by Tosoh Corporation

Column: TSK-gel G4000HXL and TSK-gel G2000HXL

Eluent: THF (Tetrahydrofuran)

Flow rate: 1.0 m/min

Detection device: RI

Next, to 1000 g of the obtained component (A), 600 g of Ep807 as the component (B), 500 g of Ep604 as the component (C), and 800 g of DDS as the component (D) were sequentially introduced, and they were sufficiently mixed using a table kneader at 60° C. until they were uniformly distributed, thereby preparing a resin composition. The blending ratio of each of the components are summarized in Table 1. Moreover, the component (D) was blended such that the theoretical equivalent relative to the epoxy group was 120%.

After the obtained resin composition was defoamed, and this composition was sandwiched between glass sheets, and cured at 180° C. for 2 hours, thereby obtaining a resin sheet. For the obtained resin, physical properties (strength, elastic modulus, and elongation) were measured using a three-point bending test in accordance with JIS K6911. Further, the glass transition temperature (Tg) was measured using a TMA method. The results are shown in Table 2.

The obtained resin composition was uniformly applied on a releasing paper sp as to be an amount of 78 g/m², and then carbon fibers (manufactured by Mitsubishi Rayon Ltd., Pyrofil MR50A) were unidirectionally aligned against the applied surface, heated, and pressed to be impregnated with the resin composition, thereby preparing a unidirectional prepreg (composite intermediate material) having a fiber areal weight of 145 g/m², and a resin content of 35% by mass.

This prepreg was laminated quasi-isotropically to [0°]10 and [+45°/0°/−45°/90°]4S and the laminate was cured at 180° C. for 2 hours by using an autoclave to obtain a composite material.

For the obtained composite material, a 0° Compressive strength, an interlayer shear strength (ILSS) at 120° C., an interlayer shear strength (ILSS) at 70° C. after moisture absorption to saturation, and a compression after impact (CAI) were measured.

Similarly, the resin composition was uniformly applied on a releasing paper in an amount of 70 g/m², and then unidirectionally aligned carbon fibers (manufactured by Mitsubishi Rayon Ltd., Pyrofil MR50A) were disposed between two such resin films. The system was heated and pressed to impregnate the fibers with the resin composition, thereby preparing a unidirectional prepreg having a reinforcing fiber areal weight of 260 g/m², and a resin content of 35% by mass. This prepreg was laminated to [0/+45°/−45°/0°/90°]2S, and cured under the same condition as described above. The openhole tensile strength (OHT) of the resulting composite material was measured. The results are shown in Table 2.

The properties of the composite materials were measured by the following methods, and the measurement results were normalized for a fiber volume content of 60%.

(1) 0° Compressive Strength

The compressive strength was determined by a 0°-direction compression test according to ASTM D-695. The 0° Compressive strength after moisture absorption was determined by allowing the formed composite material to absorb moisture to saturation, and measuring it at 70° C.

(2) Interlayer Shear Strength (ILSS) at 120° C.

The interlayer shear strength was measured according to JIS K7078 under a measurement atmosphere that was maintained at 120° C.±1° C. by an oven.

(3) Interlayer Shear Strength (ILSS) at 70° C. after Absorbing Moisture to saturation at 70° C.

The interlayer shear strength was measured under a condition of 70° C. in accordance with JISK7078 by allowing the composite material to absorb moisture to saturation at 70° C., and lowering the temperature to room temperature.

(4) Compression after Impact (CAI)

The compression after impact was determined according to NASA RP 1092, by fixing a composite material having a panel dimension of 4"×4" on a table with a hole of 3"×5", dropping a weight of 4.9 kg with a ½ inch radius nose on the center of the panel to give an impact of 1,500 lbs. in per inch of the panel thickness, and then subjecting the panel to a compression test.

(5) Open-Hole Tensile Strength (OHT)

A sample was cut to a size of 32 mm in width and 290 mm in length, and then a hole of 6.35 mm in diameter was drilled at the center. The tensile strength in the 0° direction was determined according to ASTM D3039, by inserting the sample at a distance between the markings of 180 mm at 23° C.

Examples 2 to 22

A resin composition was obtained in the same manner as in Example 1, except that the blending ratios of the components were changed as shown in Table 1. Further, using the obtained resin composition, a resin sheet and a composite material were prepared in the same manner as in Example 1. The same measurements as in Example 1 were conducted with the resin sheet and the composite material. The results are shown in Table 2.

Further, in each example, the amount of the unreacted phenolic hydroxyl groups of 4,4'-(p-phenylenediisopropylidene) bis(2,6-xylenol) in the component (A) was 1% or less. Further, the component (D) was blended such that the theoretical equivalent relative to the epoxy group was 120%.

Examples 23 and 24

A resin sheet and a composite material were prepared in the same manner as in Example 1, except that the blending ratios of the components were changed as shown in Table 1, and carbon fibers (manufactured by Mitsubishi Rayon Ltd., Pyrofil MR60H) were used. The same measurements as in Example 1 were conducted with the resin sheet and the composite material.

Example 25

The resin composition prepared in Example 1 was uniformly applied on a releasing paper coated in the amount of 60 g/m², to prepare a resin film. Then, unidirectionally aligned carbon fibers (manufactured by Mitsubishi Rayon Ltd., Pyrofil MR50A) were disposed between two such resin films, and the system was heated and pressed to impregnate the carbon fibers with the resin film on both sides, thereby preparing a unidirectional prepreg (composite intermediate material) having a fiber areal weight of 260 g/m², and a resin content of 31.6% by mass. The resin composition prepared in Example 1 was uniformly applied on a releasing paper in an amount of 20 g/m², to prepare a resin film, and this resin film was adhered onto the surface of the prepreg, to prepare a unidirectional prepreg (composite intermediate material) having a fiber areal weight of 260 g/m², and a resin content of 35% by mass. A reinforcing fiber composite material was prepared in the same manner as in Example 1, and various physical properties were measured. The results are shown in Table 2.

Example 26

The resin composition prepared in Example 13 was uniformly applied on a releasing paper in the amount of 60 g/m², to prepare a resin film. Then, in the same manner as in Example 25, a unidirectional prepreg (composite intermediate material) having a fiber areal weight of 260 g/m², and a resin content of 31.6% by mass was prepared. 4% by weight of a polyethersulfone (manufactured by Sumitomo Chemical Co., Ltd., PES5003P) was dissolved in the resin composition of Example 9, to which polyamide had not been added. Then, a resin composition mixed with 1% by weight of Aerosil was uniformly applied on the surface of a releasing paper in an amount of 20 g/m², to prepare a resin film. Then, the resin film was adhered onto the surface of the prepreg to prepare a unidirectional prepreg (composite intermediate material) having a fiber areal weight of 260 g/m², and a resin content of 35% by mass. Various physical properties were achieved, as in Example 1. The results are shown in Table 2.

Comparative Examples 1 and 3

A resin composition was obtained by preparing the component (A) in the same manner as in Example 1 (A), except that the blending ratios of the components were changed as shown in Table 3. Further, using the obtained resin composition, a resin sheet and a composite material were prepared in the manner in the same manner as in Example 1. The same measurements as in Example 1 were conducted. The results are shown in Table 4.

Comparative Example 2

320 g of Ep807 and 60 g of Ep828 as the component (a1), and 100 g of TPAE32 as the component (a4) were mixed, and the mixture was heated at 180° C. for 4 hours to dissolve the component (a4) in the component (a1). Thereafter, 250 g of Ep630 as the component (a2) and 350 g of 4,4'-(p-phenylenediisopropylidene) bis(2,6-xylenol) as the component (a3) were mixed without heating to obtain a component (A). Since the mixture was not heated, the amount of the unreacted phenolic hydroxyl groups of 4,4'-(p-phenylenediisopropylidene) bis(2,6-xylenol) was 80%.

Next, a resin composition was prepared in the same manner as in Example 1, except that the obtained component (A) was used. Moreover, using the obtained resin composition, a resin sheet and a composite material were prepared, in the same matter as in Example 1.

TABLE 1

| | Component A | | | | | | | |
|---|---|---|---|---|---|---|---|---|
| | a)Ep807 Parts by wt | a)Ep828 Parts by wt | a)HP7200 Parts by wt | b)Ep630 Parts by wt | Phenol Component Part by wt | TPP Parts by wt | TPAE32 Parts by wt | Polyamide Content (%) |
| EXAMPLE 1 | 58 | 0 | 0 | 6 | 35 | 1 | 6 | 6.0% |
| EXAMPLE 2 | 52 | 6 | 0 | 6 | 35 | 1 | 10 | 9.3% |
| EXAMPLE 3 | 52 | 0 | 0 | 13 | 35 | 1 | 10 | 8.7% |
| EXAMPLE 4 | 45 | 0 | 0 | 16 | 35 | 1 | 10 | 9.0% |
| EXAMPLE 5 | 52 | 0 | 0 | 13 | 35 | 1 | 13 | 11.3% |
| EXAMPLE 6 | 58 | 0 | 0 | 6 | 35 | 1 | 16 | 13.8% |
| EXAMPLE 7 | 52 | 0 | 0 | 13 | 35 | 1 | 16 | 13.8% |
| EXAMPLE 8 | 48 | 0 | 0 | 16 | 35 | 1 | 16 | 13.8% |
| EXAMPLE 9 | 39 | 0 | 0 | 26 | 35 | 1 | 16 | 13.8% |
| EXAMPLE 10 | 58 | 0 | 0 | 6 | 35 | 1 | 23 | 18.3% |
| EXAMPLE 11 | 52 | 0 | 0 | 13 | 35 | 1 | 23 | 18.3% |
| EXAMPLE 12 | 45 | 0 | 0 | 19 | 35 | 1 | 23 | 18.3% |
| EXAMPLE 13 | 58 | 0 | 0 | 6 | 35 | 1 | 6 | 6.0% |
| EXAMPLE 14 | 52 | 6 | 0 | 6 | 35 | 1 | 10 | 9.3% |
| EXAMPLE 15 | 58 | 0 | 0 | 6 | 35 | 1 | 6 | 6.0% |
| EXAMPLE 16 | 58 | 0 | 0 | 6 | 35 | 1 | 6 | 6.0% |
| EXAMPLE 17 | 58 | 0 | 0 | 6 | 35 | 1 | 10 | 8.7% |
| EXAMPLE 18 | 61 | 0 | 0 | 4 | 35 | 1 | 6 | 6.0% |
| EXAMPLE 19 | 61 | 0 | 0 | 4 | 35 | 1 | 6 | 6.0% |
| EXAMPLE 20 | 61 | 0 | 0 | 4 | 35 | 1 | 6 | 6.0% |
| EXAMPLE 21 | 58 | 0 | 0 | 6 | 35 | 1 | 6 | 6.0% |
| EXAMPLE 22 | 43 | 0 | 15 | 6 | 35 | 1 | 6 | 7.0% |
| EXAMPLE 23 | 58 | 0 | 0 | 6 | 35 | 1 | 6 | 6.0% |
| EXAMPLE 24 | 52 | 0 | 0 | 13 | 35 | 1 | 10 | 8.7% |
| EXAMPLE 26 | 17 | 0 | 0 | 3 | 11 | 0.3 | 2 | 5.2% |

| | Component A Parts by wt | Component B Ep807 Parts by wt | Component C Ep604 Parts by wt | Component D DDS Parts by wt | Other components | |
|---|---|---|---|---|---|---|
| | | | | | Aerosil | PES |
| EXAMPLE 1 | 50 | 30 | 25 | 40 | 0 | 0 |
| EXAMPLE 2 | 50 | 30 | 25 | 40 | 0 | 0 |
| EXAMPLE 3 | 50 | 30 | 25 | 40 | 0 | 0 |
| EXAMPLE 4 | 50 | 30 | 25 | 40 | 0 | 0 |
| EXAMPLE 5 | 50 | 30 | 25 | 40 | 0 | 0 |
| EXAMPLE 6 | 50 | 30 | 25 | 40 | 0 | 0 |
| EXAMPLE 7 | 50 | 30 | 25 | 40 | 0 | 0 |
| EXAMPLE 8 | 50 | 30 | 25 | 40 | 0 | 0 |
| EXAMPLE 9 | 50 | 30 | 25 | 40 | 0 | 0 |
| EXAMPLE 10 | 55 | 30 | 25 | 40 | 0 | 0 |
| EXAMPLE 11 | 55 | 30 | 25 | 40 | 0 | 0 |
| EXAMPLE 12 | 55 | 30 | 25 | 40 | 0 | 0 |
| EXAMPLE 13 | 50 | 30 | 25 | 40 | 2 | 0 |
| EXAMPLE 14 | 50 | 30 | 25 | 40 | 2 | 0 |
| EXAMPLE 15 | 48 | 25 | 30 | 42 | 1 | 0 |
| EXAMPLE 16 | 48 | 25 | 30 | 42 | 2 | 0 |
| EXAMPLE 17 | 49 | 20 | 35 | 42 | 2 | 0 |
| EXAMPLE 18 | 48 | 20 | 35 | 42 | 1 | 0 |
| EXAMPLE 19 | 48 | 20 | 35 | 42 | 2 | 0 |
| EXAMPLE 20 | 49 | 25 | 30 | 42 | 1 | 0 |
| EXAMPLE 21 | 48 | 20 | 35 | 42 | 1 | 0 |

TABLE 1-continued

|  |  |  |  |  |  |  |
|---|---|---|---|---|---|---|
| EXAMPLE 22 | 48 | 30 | 25 | 42 | 0 | 0 |
| EXAMPLE 23 | 48 | 30 | 25 | 42 | 2 | 0 |
| EXAMPLE 24 | 49 | 30 | 25 | 42 | 3 | 0 |
| EXAMPLE 26 | 49 | 30 | 25 | 42 | 2 | 0.8 |

TABLE 2

| | Three-point bending property of resin | | | Heat Resistance | Mechanical properties of composite | | | | |
|---|---|---|---|---|---|---|---|---|---|
| | | | | | 0° Compressive strength | | ILSS | | |
| | Strength (MPa) | Elasticity (GPa) | Elongation (%) | G' – Tg (° C.) | 23° C. (MPa) | 70° C./Moisture Absorption (MPa) | 70 moisture Absorption (MPa) | 120° C. (MPa) | CAI (MPa) |
| EXAMPLE 1 | 163 | 3.32 | 12% or more | 166 | 1450 | 1206 | 53 | 62 | 203 |
| EXAMPLE 2 | 154 | 3.18 | 12% or more | 168 | 1553 | 1235 | 54 | 58 | 220 |
| EXAMPLE 3 | 158 | 3.16 | 12% or more | 172 | 1560 | 1228 | 55 | 61 | 213 |
| EXAMPLE 4 | 157 | 3.21 | 12% or more | 175 | 1540 | Not measured | 55 | 67 | 204 |
| EXAMPLE 5 | 158 | 3.25 | 12% or more | 172 | 1603 | Not measured | 53 | 65 | 214 |
| EXAMPLE 6 | 142 | 3.01 | 12% or more | 169 | 1553 | Not measured | 52 | 55 | 213 |
| EXAMPLE 7 | 146 | 3.04 | 12% or more | 173 | 1552 | Not measured | 57 | 68 | 204 |
| EXAMPLE 8 | 151 | 3.10 | 12% or more | 172 | 1676 | Not measured | 52 | 62 | 211 |
| EXAMPLE 9 | 154 | 3.19 | 12% or more | 182 | 1701 | Not measured | 58 | 63 | 203 |
| EXAMPLE 10 | 131 | 2.99 | 8.3 | 169 | 1450 | Not measured | 51 | 53 | 224 |
| EXAMPLE 11 | 133 | 3.04 | 8.1 | 175 | 1458 | Not measured | 53 | 54 | 212 |
| EXAMPLE 12 | 135 | 3.07 | 8.0 | 178 | 1543 | Not measured | 54 | 53 | 206 |
| EXAMPLE 13 | 165 | 3.35 | 12% or more | 167 | 1510 | 1202 | 53 | 62 | 203 |
| EXAMPLE 14 | 159 | 3.21 | 12% or more | 169 | 1567 | 1220 | 55 | 61 | 205 |
| EXAMPLE 15 | 164 | 3.40 | 7.6 | 176 | 1593 | 1216 | 62 | 77 | 199 |
| EXAMPLE 16 | 164 | 3.40 | 7.6 | 176 | 1624 | 1347 | 63 | 79 | 204 |
| EXAMPLE 17 | 162 | 3.46 | 7.9 | 182 | 1646 | Not measured | 62 | 79 | 193 |
| EXAMPLE 18 | 162 | 3.45 | 8.3 | 182 | 1696 | 1221 | 64 | 80 | 204 |
| EXAMPLE 19 | 165 | 3.46 | 8.3 | 185 | 1684 | 1199 | 65 | 81 | 195 |
| EXAMPLE 20 | 160 | 3.36 | 9.2 | 175 | 1588 | Not measured | 66 | 77 | 219 |
| EXAMPLE 21 | 167 | 3.46 | 7.8 | 180 | 1635 | 1344 | 64 | 80 | 191 |
| EXAMPLE 22 | 165 | 3.43 | 11.2 | 171 | 1574 | 1301 | 57 | 63 | 192 |
| EXAMPLE 23 | 165 | 3.47 | 12% or more | 167 | 1588 | 1179 | 53 | 56 | 197 |
| EXAMPLE 24 | 164 | 3.45 | 12% or more | 164 | 1468 | 1166 | 50 | 67 | 198 |
| EXAMPLE 25 | 162 | 3.40 | 12% or more | 165 | 1626 | 1289 | 60 | 62 | 221 |
| EXAMPLE 26 | 162 | 3.40 | 12% or more | 167 | 1610 | 1204 | 61 | 60 | 217 |

TABLE 3

| | Component A | | | | | | | Component B Ep807 parts by weight | Component C Ep604 parts by weight | Component D DBS parts by weight | Other component Aerosil |
|---|---|---|---|---|---|---|---|---|---|---|---|
| | a) Ep807 parts by weight | a) Ep828 | a) HP7200 parts by weight | b) Ep630 parts by weight | Phenol compound parts by weight | TPP parts by weight | TPAE32 parts by weight | Polyamide Content (%) | | | |
| Comp. Ex. 1 | 32 | 6 | 0 | 25 | 35 | 1 | 0 | 0.0% | 50 | 30 | 25 | 40 | 0 |
| Comp. Ex. 2 | 32 | 6 | 0 | 25 | 35 | 0 | 10 | 9.4% | 50 | 30 | 25 | 40 | 0 |
| Comp. Ex. 3 | 58 | 0 | 0 | 6 | 35 | 1 | 48 | 32.4% | 50 | 30 | 25 | 40 | 0 |

TABLE 4

| | Three-point bending property of resin | | | Heat resistance | Mechanical properties of composite | | | | |
| | | | | | 0° Compressive strength | | ILSS | | |
| | Strength (Mpa) | Elasticity (GPa) | Elongation (%) | G' – Tg (°C.) | 23° C. (Mpa) | 70° C./Moisture absorption (Mpa) | 70° C./Moisture absorption (Mpa) | 120° C. (Mpa) | CAI (Mpa) |
|---|---|---|---|---|---|---|---|---|---|
| Comp. Ex. 1 | 171 | 3.44 | 12% or more | 180 | 1563 | 1325 | 64 | 62 | 181 |
| Comp. Ex. 2 | — | — | — | — | — | — | — | — | — |
| Comp. Ex. 3 | 138 | 2.60 | 12% or more | 147 | 1270 | Not conducted | 39 | 40 | 222 |

In each of the examples, the resin composition had good three-point bending properties and good heat resistance, and the characteristics (such as 0° Compressive strength, mechanical properties under high temperature and high humidity conditions (ILSS), and impact resistance (compression after impact (CAI)) of the composite material exceeded the corresponding target levels. As a result, it was possible to simultaneously satisfy all of these characteristics, which had hardly been accomplished in prior art. Here, the target levels are as follows:
Heat resistance (Tg): 150° C.;
0° Compressive strength: 1350 MPa.
Interlayer shear strength (ILSS) at 120° C.: 50 MPa;
Interlayer shear strength (ILSS) at 70° C. after adsorbing moisture to saturation at 70° C.: 50 MPa;
Compression after impact (CAI): 190 MPa; and
Open hole tensile strength (OHT): 660 MPa.

On the other hand, in the case where the resin composition does not contain a polyamide resin (a4) (Comparative Example 1), the 0° Compressive strength and ILSS were excellent, but the impact resistance was insufficient. In the case where the resin composition contain an excessive amount of the polyamide resin (a4) (Comparative Example 3), the impact resistance was excellent, but the heat resistance was lowered, and at the same time, the interlayer shear strength (ILSS) at 120° C., which is an index of the mechanical properties of the composite material at a high temperature, was far below the target level. As a result, it was impossible to simultaneously satisfy all of these characteristics.

Further, during the preparation of the component (A), in the case where heating was not performed after addition of the component (a3) (Comparative Example 2), the polyamide resin (a4) precipitated on the surface of the composite material after curing, and the matrix resin was not uniform. Accordingly, it was impossible to conduct various measurements on these.

INDUSTRIAL AVAILABILITY

According to the present invention, a prepreg capable of providing a composite material satisfying high heat resistance, impact resistance, and mechanical properties under high temperature and high humidity conditions, can be provided.

The invention claimed is:
1. A prepreg comprising a resin composition and reinforcing fibers, the reinforcing fibers being impregnated with the resin composition, and the resin composition comprising:
20 to 70 parts by mass of epoxy resin component (A); 10 to 50 parts by mass of bifunctional epoxy resin component (B); 15 to 70 parts by mass of tetrafunctional epoxy resin component (C); and an aromatic amine compound component (D);
wherein the epoxy resin component (A) is prepared by mixing and heating:
10 to 90 parts by mass of a bifunctional epoxy resin (a1),
0.5 to 40 parts by mass of a trifunctional epoxy resin (a2),
10 to 50 parts by mass of a phenol compound (a3), and
1 to 45 parts by mass of a polyamide resin (a4), wherein (a1), (a2), and (a3) total 100 parts by mass, and wherein said heating is performed such that 80% or more of the phenolic hydroxyl groups contained in the phenol compound (a3) undergo a reaction;
wherein said phenol compound (a3) is represented by the following formula (I):

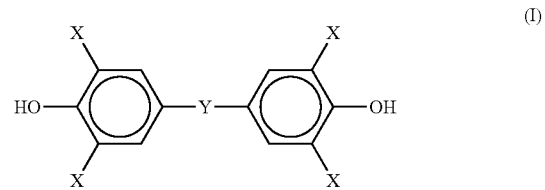

(I)

wherein X represents at least one selected from the group consisting of a hydrogen atom, an alkyl group having 6 or less carbon atoms and Br, and Y represents at least one selected from the group consisting of a direct bond, —$CH_2$—, —$C(CH_3)_2$—, —$SO_2$—, and a group represented by formula (Ia):

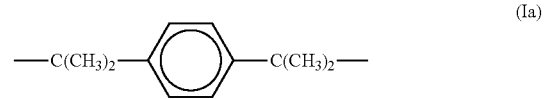

(Ia)

wherein said polyamide resin (a4) is represented by the following formula (II):

(II)

wherein X represents an integer from 1 to 10; Y represents an integer from 1 to 10, and Z represents an integer from 1 to 20; PA is represented by the following formula (III):

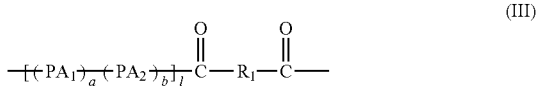

(III)

wherein a represents an integer from 0 to 2, b represents an integer from 0 to 2, and 1 represents an integer from 1 to 10, provided that a and b are not 0 at the same time; $R_1$ is —$(CH_2)_\alpha$— (wherein $\alpha$ is an integer from 2 to 40); $PA_1$ and $PA_2$ are each independently represented by the following formula (IV) and/or formula (V); and PE is represented by the following formula (VI):

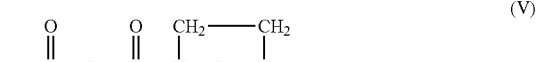

(IV)

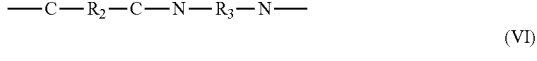

(V)

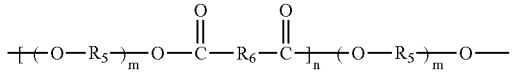

(VI)

wherein $R_2$ is —$(CH_2)_\beta$— (wherein $\beta$ is an integer from 2 to 40), $R_3$ is —$(CH_2)_d$— (wherein d is an integer from 1 to 6), $R_4$ and $R_4'$ are each independently H or $CH_3$; m and n are an integer from 3 to 20 and an integer from 1 to 10, respectively, $R_5$ is —$(CH_2)_e$— (wherein e is an integer from 2 to 8), and $R_6$ is —$(CH_2)\gamma$- (wherein $\gamma$, is an integer from 2 to 40)); and wherein said aromatic amine compound component (D) is provided in an amount of 90% to 175% of a theoretical equivalent amount of component (D), said theoretical equivalent amount of component (D)=[Total moles of epoxy groups in (a1) and (a2) that have been consumed during the preparation of component (A)]−[Moles of phenolic hydroxyl groups in component (a3) that have been consumed during the preparation of component (A)]+[Total moles of epoxy groups in components (B) and (C)].

2. The prepreg according to claim 1, wherein the epoxy resin component (A) is prepared by:
(a) mixing the polyamide resin (a4) with at least one of the bifunctional epoxy resin (a1) and the trifunctional epoxy resin (a2) to form a primary mixture;
(b) heating the primary mixture to dissolve at least a portion of the polyamide resin (a4) in the at least one of the bifunctional epoxy resin (a1) and the trifunctional epoxy resin (a2), forming a heat treated primary mixture;
(c) adding and mixing any remaining bifunctional epoxy resin (a1) or trifunctional epoxy resin (a2), along with the phenol compound (a3), to the heat treated primary mixture, forming a secondary mixture; and
(d) heating the secondary mixture such that 80% or more of the phenolic hydroxy groups contained in the phenol compound (a3) undergo a reaction.

3. The prepreg according to claim 2, wherein 90% or more of the phenolic hydroxy groups contained in the phenol compound (a3) undergo a reaction.

4. The prepreg according to claim 2, wherein, in the case where a catalyst is not present, said (d) heating is carried out at a temperature of 100 to 150° C. for 5 to 24 hours, and in the case where a catalyst is present, said (d) heating is carried out at a temperature of 100 to 130° C. for 2 to 6 hours.

5. The prepreg according to claim 4, wherein said catalyst is triphenylphosphine.

6. The prepreg according to claim 1, wherein said bifunctional epoxy resin (a1) is at least one member selected from the group consisting of a bisphenol A epoxy resin, a bisphenol F epoxy resin, a bromination product of a bisphenol A epoxy resin, a bromination product of a bisphenol F epoxy resin, a bisphenol S epoxy resin, an epoxy resin having an alkyl backbone in the main chain, a biphenyl epoxy resin, a naphthalene epoxy resin, a dicyclopentadiene epoxy resin, a fluorene epoxy resin, and a modification product thereof.

7. The prepreg according to claim 1, wherein said bifunctional epoxy resin (a1) is represented by the following formula (VII):

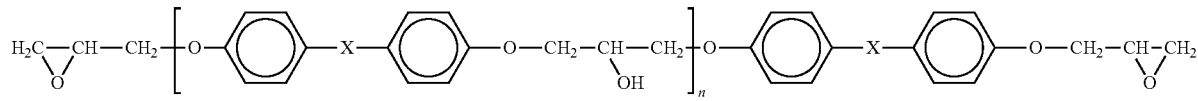

(VII)

wherein
X represents

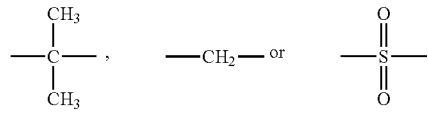

and n represents an integer of 0 to 30.

8. The prepreg according to claim 1, wherein said trifunctional epoxy resin (a2) is at least one member selected from the group consisting of
N,N,O-triglycidyl-p-aminophenol; N,N,O-triglycidyl-m-aminophenol;
N,N,O-triglycidyl-4-amino-m-cresol; N,N,O-triglycidyl-5-amino-o-cresol; and
1,1,1-triglycidyloxyphenyl)methane.

9. The prepreg according to claim 1, wherein said phenol compound (a3) is at least one member selected from the group consisting of 4,4'-dihydroxybiphenyl; 4,4'-dihydroxy-3,3',5,5'-tetramethyldihydroxybiphenyl; 4,4'-dihydroxy-3,3',5,5'-tetra-tert-butyldiphenyl; bisphenol F; tetramethylbisphenol F; bisphenol A; tetramethylbisphenol A; bisphenol S; tetramethylbisphenol S; 4,4'-(p-phenylenediisopropylidene)bis(xylenol).

10. The prepreg according to claim 1, wherein said bifunctional epoxy resin (B) is at least one member selected from the group consisting of a bisphenol A epoxy resin, a bisphenol F epoxy resin, a bromination product of a bisphenol A epoxy resin, a bromination product of a bisphenol F epoxy resin, a bisphenol S epoxy resin, an epoxy resin having an alkyl backbone in the main chain, a biphenyl epoxy resin, a naphthalene epoxy resin, a dicyclopentadiene epoxy resin, a fluorene epoxy resin, and a modification product thereof.

11. The prepreg according to claim 1, wherein said tetrafunctional epoxy resin component (C) is selected from the group consisting of N,N,N',N'-tetraglycidylaminodiphenylmethane;

N,N,N',N'-tetraglycidyl-4,4'-(4-aminophenyl)-p-diisopropylbenzene; and 1,1,2,2-(tetraglycidyloxyphenyl)ethane.

12. The prepreg according to claim 1, wherein component (D) is operable as a curing agent, and is selected from the group consisting of 4,4'-diaminodiphenylsulfone; 3,3'-diaminodiphenylsulfone; 4,4'-diaminodiphenylmethane; 4,4'-diaminodiphenylether; and trimethylene bis(4-aminobenzoate).

13. The prepreg according to claim 1, wherein component (D) is selected from the group consisting of 4,4'-diaminodiphenylsulfone and 3,3'-diaminodiphenylsulfone.

14. The prepreg according to claim 1, wherein said resin composition comprises 0 to 20% by weight, relative to the total mass of components (A), (B) and (C), of an epoxy resin (E) selected from the group consisting of an epoxy resin having triglycidyl p-aminophenol, triglycidyl m-aminophenol or triglycidylaminocresol as the precursor or various isomers thereof; a novolak epoxy resin; an epoxy resin having an alicyclic epoxy resin as a precursor; and an epoxy resin having a naphthalene backbone.

15. The prepreg according to claim 1, wherein the resin composition comprises 45 to 55 parts by mass of epoxy resin component (A); 20 to 35 parts by mass of bifunctional epoxy resin (B); 20 to 35 parts by mass of tetrafunctional epoxy resin component (C); and 35 to 45 parts by mass of an aromatic amine compound (D).

16. The prepreg according to claim 1, wherein the reinforcing fiber is selected from the group consisting of a carbon fiber, a glass fiber, an aramid fiber, a boron fiber, and a silicon carbide fiber, and the reinforcing fiber is in the form of a milled fiber, a chopped fiber, a continuous fiber or a fabric.

17. The prepreg according to claim 1, wherein the reinforcing fiber is a carbon fiber having a tensile strength of 450 MPa or more and a tensile elongation of 1.7% or more, which is in the form of a continuous fiber or a fabric.

18. The prepreg according to claim 1, wherein the resin composition exhibits high heat resistance with a glass transition temperature (Tg) of higher than 150° C.

* * * * *